Oct. 21, 1924.
A. KNECHTEL
1,512,181
TREE CUTTING MACHINE
Original Filed July 19, 1922    2 Sheets-Sheet 1
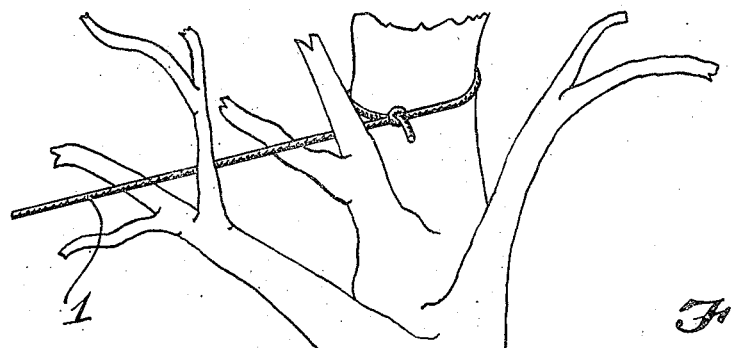
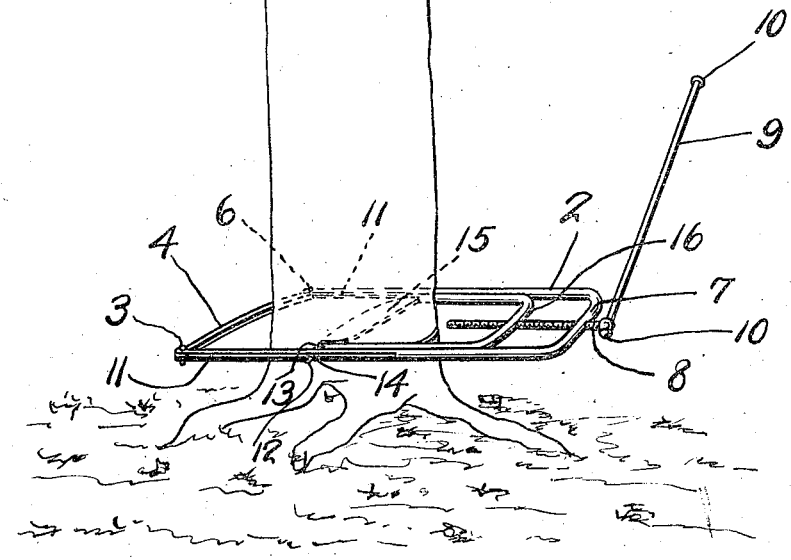
Alfred Knechtel
INVENTOR Oct. 21, 1924.                                                1,512,181
                           A. KNECHTEL
                        TREE CUTTING MACHINE
                   Original Filed July 19, 1922   2 Sheets-Sheet 2
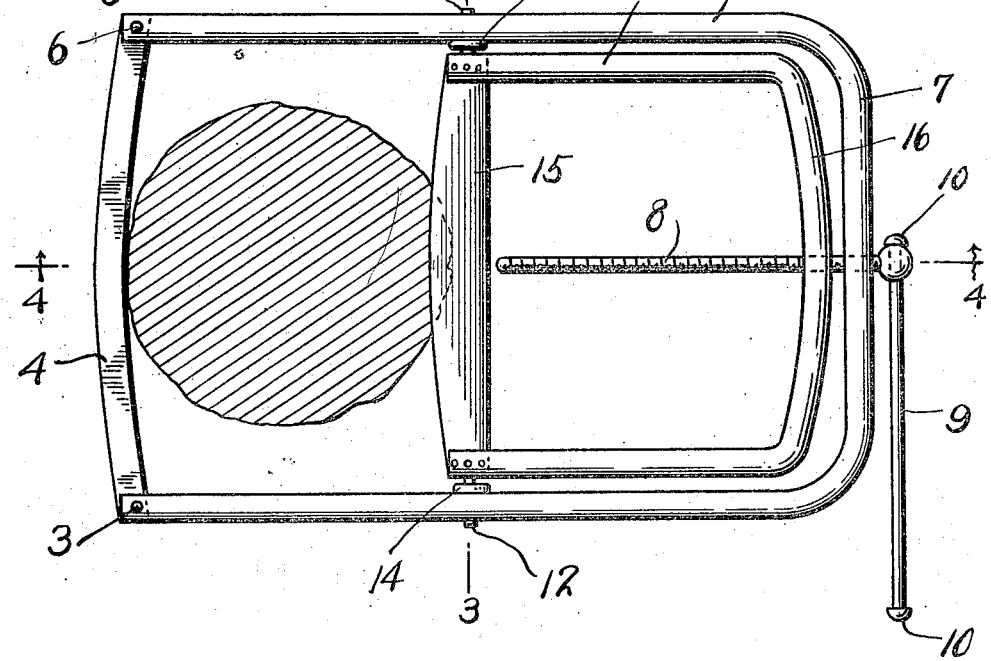
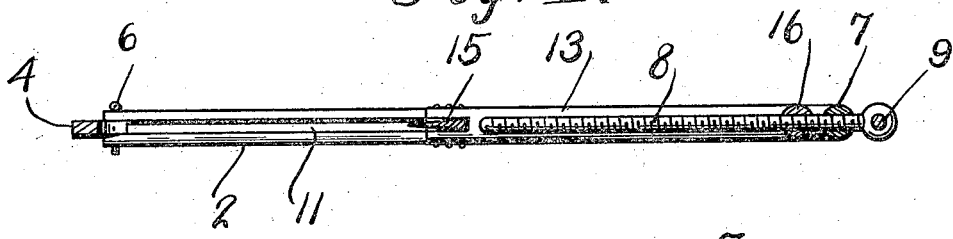
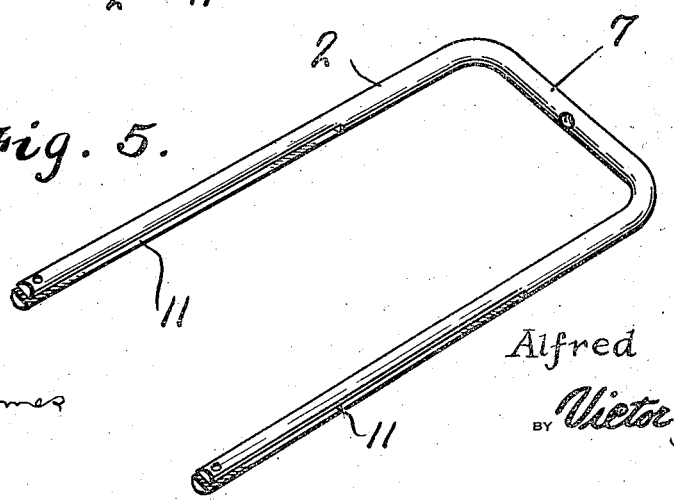
Alfred Knechtel
INVENTOR Patented Oct. 21, 1924.

1,512,181

UNITED STATES PATENT OFFICE.

ALFRED KNECHTEL, OF TAMPICO, MEXICO.

TREE-CUTTING MACHINE.

Application filed July 19, 1922, Serial No. 576,164. Renewed August 22, 1924.

*To all whom it may concern:*

Be it known that I, ALFRED KNECHTEL, a citizen of Czechoslovakia, residing at Mexico, D. F., post-office address Lista de Correos, Tampico, Tampo, Mexico, have invented new and useful Improvements in Tree-Cutting Machines, of which the following is a specification.

My present invention has reference to a means for manually cutting or felling trees in a comparatively easy and expeditious manner.

My object is to produce a tree cutting apparatus in which a blade is employed as the cutting means, said apparatus being provided with simple, strong and effective means for advancing the blade to its work.

A further object is to produce a tree cutting apparatus in which a substantially U-shaped frame is employed, the latter having at its open end a pivoted gate and means for latching the same to the frame, the frame designed to be arranged around the tree to be felled, and has threaded through its closed end a screw which operates a second frame that is guided in the first frame, the last mentioned frame carrying a cutting blade which, upon the turning of the screw will be advanced to cutting engagement with the tree, the gate of the main frame being arranged in contacting engagement with the tree at the part thereof opposite that engaged by the blade.

A further object is to produce a tree cutting apparatus whereby trees may be successfully cut or felled at any desired height with respect to the ground.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a view illustrating the manner in which a tree is felled in accordance with this invention.

Figure 2 is a plan view of the improvement, the tree being in section.

Figure 3 is a sectional view on the line 3—3 of Figure 2, the tree being omitted.

Figure 4 is a sectional view on the line 4—4 of Figure 3.

Figure 5 is a detail perspective view of the substantially U-shaped frame forming a part of this invention.

As disclosed in Figure 1 of the drawings, a tree to be severed has secured to one of its upper branches a rope or cable 1, the same having its free end attached to any suitable support, or if desired, the said end of the rope may be held by one of the operators, it being necessary that a pull be exerted on the rope at certain intervals.

In carrying out my invention, I make use of a substantially U-shaped frame 2. The arms of the frame are spaced a suitable distance from each other sufficient to receive therebetween the trunk of the tree to be severed. Pivotally secured to the outer end of one of the arms of the frame as at 3 is what I term a gate member 4. The gate is really in the nature of a bar which has its inner edge concaved and its outer edge preferably convexed. The ends of the gate are straight, and the straight end opposite that through which the pivot 3 passes, is received in the end of the second arm of the U-shaped frame 2. A removable pivot 6 securing the end of the said gate to the said arm passes through the said end of the gate, and the bifurcated end of the arm, and whereby the gate is effectively latched on the frame.

The connecting member 7, for the parallel arms of the frame 2 is centrally formed with an opening that receives therethrough the non-threaded portion of the shank of a screw 8. The outer end of the screw is enlarged to provide the same with what may be termed a head, the said head having a transverse opening therethrough. Through this opening there is passed the operating bar or handle 9. The bar or handle has both of its ends headed, as at 10.

The arms of the frame 2 are, for a determined length provided with parallel centrally arranged elongated openings 11 which extend to the outer ends thereof and which receive therethrough short shafts or trunnions 12 on the ends of the substantially U-shaped blade carrying frame 13. On each trunnion there is an anti-frictional roller 14 that is in contact with the opposed longitudinal walls provided by the openings 11. Removably secured between the arms of the blade carrying frame, at the outer end of the said frame there is a cutting blade 15. The blade has its cutting edge rounded inwardly from its center to its ends.

The connecting portion 16 for the arms of the blade carrying frame 13 is centrally formed with a threaded bore, and the threads thereof engage with the threads of the screw.

It is thought that the operation of the device will be apparent to those skilled in the art to which such inventions relate. The main frame is, as previously stated, positioned to surround the trunk of a tree. The frame may be arranged at any desired elevation above the ground. The operating handle 9 for the screw 8 is, as previously stated, freely movable through the headed end of the screw. This permits of the same having its major portion brought away from ground contacting position, which also affords a greater leverage to the operator. The screw is turned for a length approximately equalling one-half of a circle, and the operating bar is then moved through the opening in the screw to again arrange the bar in a position for further operation as just described. The screw will slowly but effectively advance the blade to its work, and a pull is exerted on the guy rope 1 when the tree is almost or completely cut, so that the same will be moved off of the stump without inflicting injury to the cutting device or to the operator thereof.

Having described the invention, I claim:—

1. In a tree cutting machine, a substantially U-shaped frame to receive a tree to be cut therein, the parallel arms of the frame being bifurcated for the major portion of their lengths, a gate pivotally supported by one of the arms of the frame, means for latching the gate to the second arm of the frame, a screw having a non-threaded portion received in a bearing opening in the frame, a slidable operating bar for the screw, a substantially U-shaped blade carrying frame in the first mentioned frame having outstanding trunnions on the ends thereof, anti-frictional rollers on the trunnions received between the bifurcated arms of the first mentioned frame, a removable cutter blade on the last mentioned frame, and said last mentioned frame having a threaded opening to receive the screw therethrough as and for the purpose specified.

2. In a tree cutting machine, a substantially U-shaped frame having its respective parallel arms centrally arranged with aligned elongated openings terminating adjacent the arm connecting members thereof, said U-shaped frame having its arm connecting member provided with a centrally arranged opening, a screw having a non-threaded portion finding a bearing in the opening of the arm connecting member, a blade carrying frame threadedly receiving the screw and designed for movement within the substantially U-shaped frame, trunnions oppositely disposed from the outer opposite side of the blade carrying frame, rollers carried by the trunnions for engaging the walls of the elongated openings, a blade bridging the blade carrying frame and manually operated means associated with the outer end of the screw for moving the blade and frame thereof on the rollers as and for the purpose specified.

In testimony whereof I affix my signature.

ALFRED KNECHTEL.